United States Patent
Rollhaus et al.

[11] Patent Number: 6,011,772
[45] Date of Patent: Jan. 4, 2000

[54] MACHINE-READABLE OPTICAL DISC WITH READING-INHIBIT AGENT

[75] Inventors: Philip E. Rollhaus, Chicago, Ill.; John R. Powell, Arlington, Mass.; Eric J. Carlson, Sudbury, Mass.; Daniel J. Ehntholt, Hudson, Mass.; Irwin C. Winkler, Arlington, Mass.; Christopher J. Marmo, Nashua, N.H.; James R. Valentine, Reading, Mass.

[73] Assignee: SpectraDisc Corporation, Providence, R.I.

[21] Appl. No.: 08/902,844

[22] Filed: Jul. 30, 1997

Related U.S. Application Data

[60] Provisional application No. 60/026,390, Sep. 16, 1996.

[51] Int. Cl.⁷ ........................................................ G11B 3/70
[52] U.S. Cl. ............................................................. 369/286
[58] Field of Search ............................... 369/286; 428/64.4

[56] References Cited

U.S. PATENT DOCUMENTS

| | | | |
|---|---|---|---|
| 4,542,288 | 9/1985 | Drexler | 235/487 |
| 4,866,769 | 9/1989 | Karp | 380/4 |
| 4,879,704 | 11/1989 | Takagi et al. | 369/14 |
| 4,975,898 | 12/1990 | Yoshida | 369/100 |
| 5,311,494 | 5/1994 | Sugita et al. | 369/100 |
| 5,418,852 | 5/1995 | Itami et al. | 380/4 |
| 5,426,625 | 6/1995 | Bui et al. | 369/44.32 |
| 5,453,968 | 9/1995 | Veldhuis et al. | 369/84 |
| 5,461,239 | 10/1995 | Atherton | 250/566 |
| 5,473,584 | 12/1995 | Oshima | 369/32 |
| 5,513,169 | 4/1996 | Fite et al. | 369/272 |
| 5,513,260 | 4/1996 | Ryan | 380/3 |
| 5,570,379 | 10/1996 | Sasaki et al. | 714/775 |
| 5,574,787 | 11/1996 | Ryan | 380/5 |
| 5,592,454 | 1/1997 | Tobita et al. | 369/58 |
| 5,629,914 | 5/1997 | Clark et al. | 369/59 |
| 5,636,292 | 6/1997 | Rhoads | 382/232 |
| 5,680,383 | 10/1997 | Clark et al. | 369/59 |
| 5,815,484 | 9/1998 | Smith | 364/275.1 |

FOREIGN PATENT DOCUMENTS 1-211285  8/1989  Japan .

OTHER PUBLICATIONS

Jun'etsu Seto, Research Center, Sony Corporation, "Photochromic Dyes," pp. 71–88.

Richard M. Tarkka et al., "Holographic Storage in a near–ir sensitive photochromic dye," *Optics Communications 109* (1994) 54–58.

Fumio Matsui, Corporate Research and Development Laboratory, Pioneer Electronic Corporation, "Optical Recording Systems," pp. 117–140.

U.S. application No. 60/009,325, Smith, filed Dec. 28, 1995.

*Primary Examiner*—David D. Davis
*Attorney, Agent, or Firm*—Ohlandt, Greeley, Ruggiero & Perle, L.L.P.

[57] ABSTRACT

An optical disc having machine-readable, information-encoding features is provided with a barrier layer secured to the disc. This barrier layer is configured to prevent machine-reading of the features. A reading-inhibit agent, included in the disc and activated by removal of the barrier layer, is operative, once activated, to alter the disc to inhibit reading of the disc. Alternately, the barrier layer can be eliminated, and the reading-inhibit agent can be activated by initial reading of the disc, as for example by exposure to optical radiation associated with reading of the disc, or rotation of the disc.

17 Claims, 5 Drawing Sheets

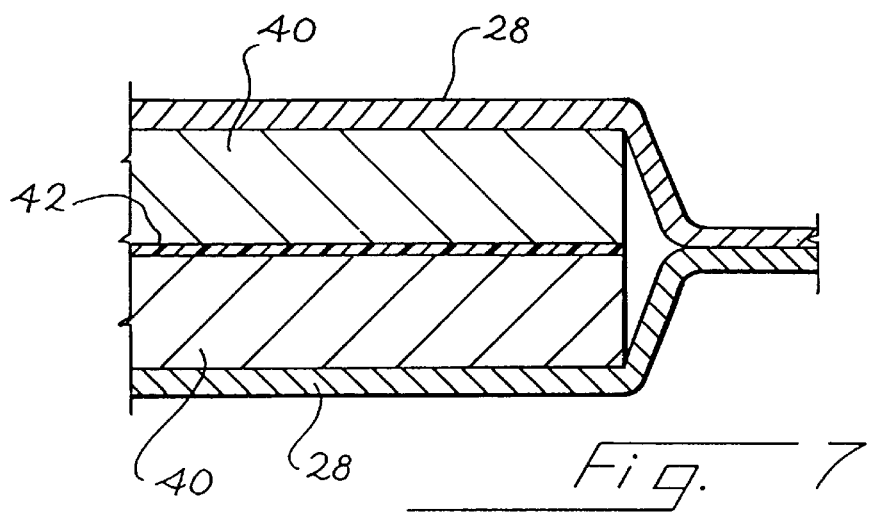
Fig. 7
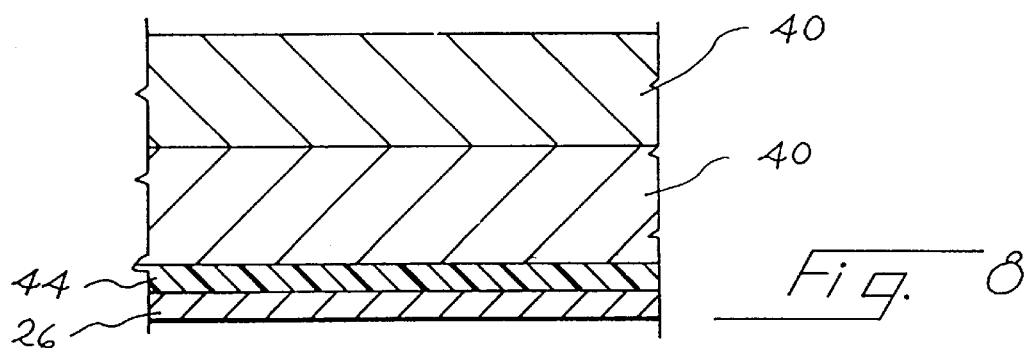
Fig. 8
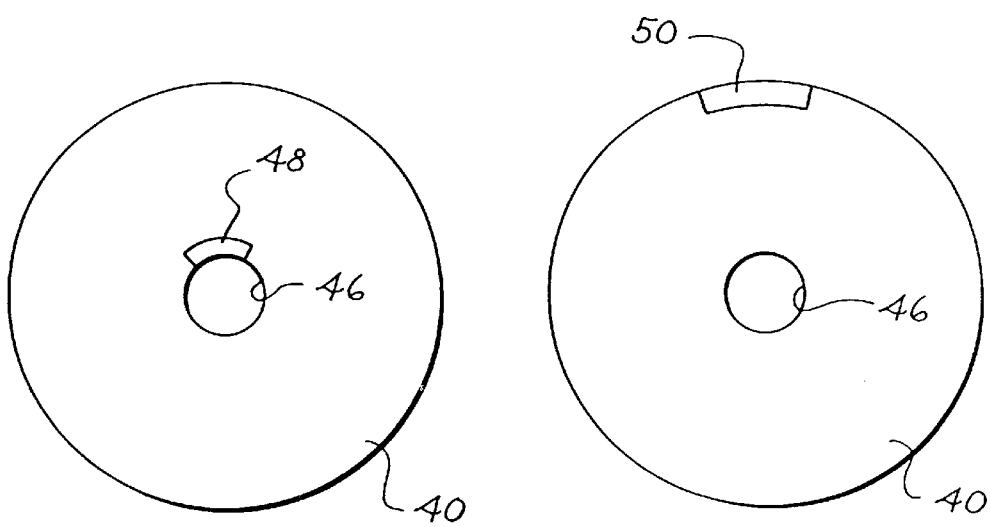
Fig. 9
Fig. 10

MACHINE-READABLE OPTICAL DISC WITH READING-INHIBIT AGENT

This application claims the benefit of U.S. Provisional Application No. 60/026,390, filed Sep. 16, 1996.

BACKGROUND OF THE INVENTION

This invention relates to machine-readable optical discs of all types, including for example digital discs such as compact discs (CD's), digital video discs (DVD's), CDROM's, and the like.

Conventional optical discs have reached widespread acceptance as a low-cost, reliable storage medium for digital information including music, video, and data. One of the traditional advantages of optical discs is their long life.

However, in some applications, the long life of the conventional optical disc may represent a disadvantage. For example, if music, movies software is to be rented for a limited time period, the original optical disc must be returned at the end of the rental period.

A need presently exists for an improved machine-readable optical disc that eliminates the need for the return of an optical disc at the end of a rental period.

SUMMARY OF THE INVENTION

According to a first aspect of this invention, an optical disc comprising machine-readable, information-encoding features is provided with a barrier layer releasably coupled to the disc. This barrier layer is configured to prevent machine-reading of the disc. A reading-inhibit agent is included in the disc, and is activated by removal of the barrier layer. This reading-inhibit agent is operative, after it is activated, to alter the disc to inhibit reading of the disc. Both the barrier layer and the reading-inhibit agent can take many forms, as discussed by way of example below.

According to another aspect of this invention, an optical disc comprising machine-readable, information-encoding features is provided with a reading-inhibit agent that is activated by machine-reading the disc. This reading-inhibit agent is operative, after it is activated, to alter the disc to inhibit reading of the disc. In alternate embodiments, the reading-inhibit agent may be activated by optical radiation incident on the disc during machine-reading of the disc, or by rotation of the disc during machine-reading of the disc.

According to a third aspect of this invention, a method is provided for inhibiting reading of an optical disc. According to this method, an optical disc is provided comprising machine-readable, information-encoding features, and a reading-inhibit agent. The reading-inhibit agent is activated by optical radiation, and is operative, once activated, to alter the disc to inhibit reading. A reading device is provided to read the disc, and this reading device comprises a source of optical radiation. According to the method of this invention, the disc is read with the reading device, and the inhibit agent is concurrently activated with optical radiation from the source. The source of optical radiation that activates the reading-inhibit agent can either be the source of optical radiation that forms the reading beam, or a second source, separate from the reading beam source.

BRIEF DESCRIPTION OF THE DRAWINGS

FIGS. 4, 5, 6, 7 and 8 are partial cross-sectional views of optical discs that incorporate first, second, third, fourth, and fifth preferred embodiments of this invention, respectively FIGS. 9 and 10 are plan views of optical discs that incorporate sixth and seventh preferred embodiments of this invention, respectively.

DETAILED DESCRIPTION OF THE PRESENTLY PREFERRED EMBODIMENTS

The present invention can be implemented in many different ways, and the following discussion will describe selected embodiments of the invention. These embodiments are intended as examples only, and not as an exhaustive list of all forms that the invention can take. Generally speaking, the embodiments discussed below can be classified into two groups. The first group uses a barrier layer to prevent premature activation of the reading-inhibit agent, while the second group does not use such a barrier layer.

Figure 16:
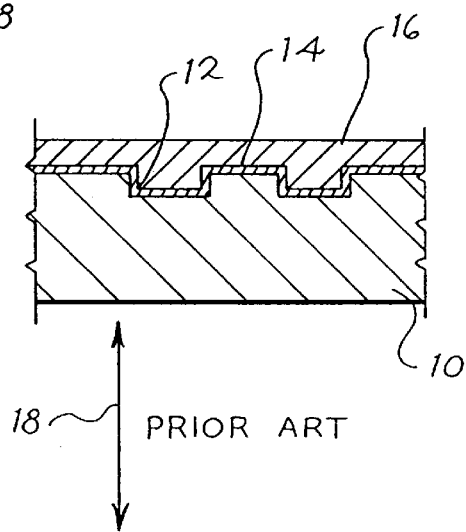
FIG. 16 is a partial cross-sectional view of a prior art compact disc.

In general, this invention can be used with the widest possible variety of optical discs comprising machine-readable, information-encoding features. FIG. 16 shows a highly schematic cross section of an optical disc such as a prior art compact disc. FIG. 16, like all of the other figures, is not drawn to scale; selected features have been exaggerated in size for clarity of illustration. The disc of FIG. 16 includes a substrate 10 which is formed with an array of information-encoding features such as pits 12. The surface defining the information-encoding features 12 is covered with a reflective layer 14, which may be, for example, formed of aluminum. The reflective layer 14 is in turn covered with a protective layer 16 which protects the reflective layer 14 from oxidation and physical damage. A reading beam aligned with the arrow 18 is incident on the surface of the substrate 10 opposite the information-encoding features 12. This reading beam passes through the substrate 10, is reflected by the reflective layer 14, and then passes out through the substrate 10 for detection. Features 10–18 described above are completely conventional. As used herein, the term "information-encoding features" is intended broadly to encompass the widest possible range of such features, regardless of the particular encoding mechanism or reading beam interaction mechanism that is used.

Embodiments that Utilize a Barrier Layer

Figure 1:
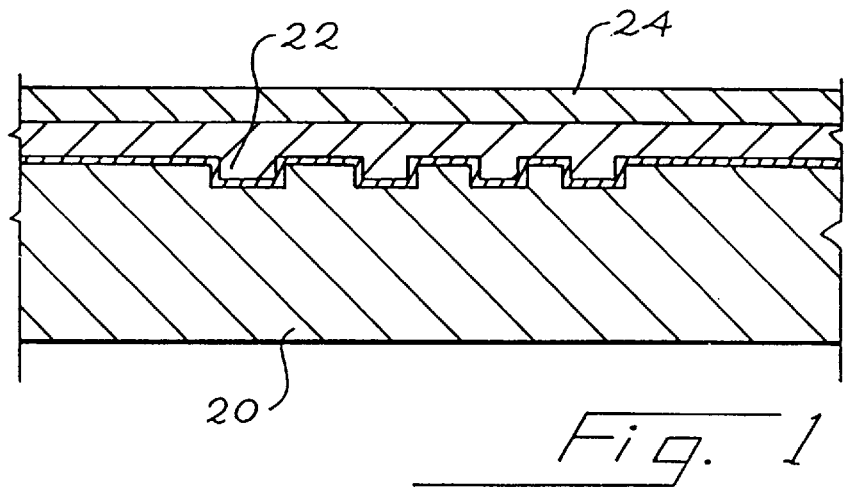
FIGS. 1 through 3 are partial cross-sectional views of three barrier layers suitable for use in embodiments of this invention.
Figure 2:
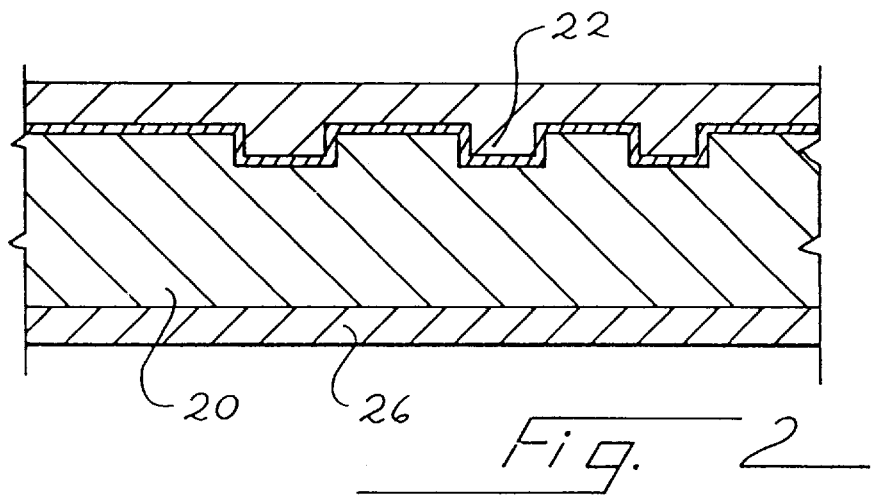
Figure 3:
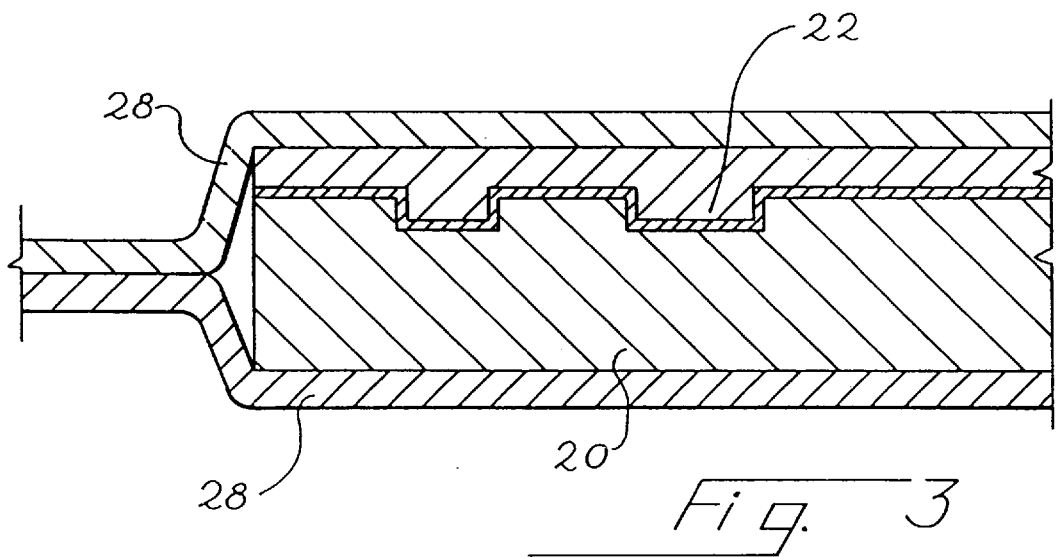

The following embodiments of the invention utilize a barrier layer to prevent activation of the reading-inhibit agent until the barrier layer has been removed. FIGS. 1–3 show three different types of barrier layers that can be used. In FIGS. 1–3, the reference symbol 20 is used to depict the optical disc, which includes information-encoding features 22 on the upper surface of the disc, in the orientation shown in the figures. In the embodiment of FIG. 1, a barrier layer 24 is releasably secured (as for example with a suitable adhesive) adjacent the surface of the optical disc 20 that carries the information-encoding features 22. In the embodiment of FIG. 2, the barrier layer 26 is releasably secured to the surface of the disc 20 opposite the surface that carries the information-encoding features 22. In the embodiment of FIG. 3, the barrier layer 28 is formed as a closed package which completely seals the optical disc 20 from contact with ambient oxygen and moisture. In this case, there is no need for the barrier layer 28 to be adhesively secured to the disc 20. As used herein, a barrier layer which is releasably coupled to an optical disc may be coupled adhesively as shown in FIGS. 1 and 2, coupled by enveloping the disc as shown in FIG. 3, or coupled in any other way that reliably associates the barrier layer and the disc prior to removal of the barrier layer.

As pointed out below, the reading-inhibit agent can take many forms and can be applied at many different places on the optical disc 20.

Depending upon the reading-inhibit agent used and its location, the position and physical and chemical characteristics of the barrier layer 24, 26, 28 can be selected as appropriate.

It is not essential in all applications that the barrier layer cover an entire surface of the disc 20. If the reading-inhibit agent is localized to a particular portion of the disc, the barrier layer may cover only an area adjacent to and aligned with that portion. Preferably, the barrier layer should prevent machine-reading of the optical disc until it is removed.

Reading-inhibit Agents that Disrupt Readability of the Optical Disc by Controlled Degradation of the Reflective Layer A first type of reading-inhibit agent disrupts the reflectivity of the reflective layer in optically read discs to such an extent that the encoded data is rendered unusable. By disrupting the readability of the disc at a known time after the initial use of the disc, or after removal of the barrier layer, the practical usage lifetime of the disc can be limited and controlled.

The reflective layer 14 that is conventionally used in optical discs is typically formed as a thin film of metallic aluminum. This aluminum film can be corroded by exposure to an oxidizing environment to such an extent that the film no longer has sufficient reflectivity to support optical reading of the disc. For example, water and oxygen from the atmosphere can form a suitable oxidizing environment for such an aluminum film. The rate and timing of the corrosion of the aluminum film can be controlled by several approaches, including control of the concentration of an oxidizing species, control of the solution pH, introduction of dissimilar metal couples, and introduction of chemical species to control solubility of aluminum. For example, in the case where atmospheric oxygen is the oxidant, a porous polymer film may be placed over the aluminum film to provide known permeability characteristics for moisture and oxygen from the atmosphere as it migrates to the aluminum film. In this case, corrosion can be substantially prevented by a barrier layer such as the barrier layer 24 of FIG. 1 or the barrier layer 28 of FIG. 3 until the barrier layer is removed prior to initial reading of the optical disc.

A key feature of optically read discs is the use of a reflective layer 14 as described above to reflect light from the interrogating light source, generally a laser operating with a principal wavelength in the visible portion of the spectrum, to the detector. The reflective layer 14 is most generally composed of metallic aluminum which is deposited on to the information-encoding features by sputtering a very thin film. This thin film is approximately 55 nanometers in thickness in conventional compact discs.

Conventional reflective layers are subject to corrosion reactions involving oxidation of the metallic aluminum and subsequent formation of aluminum compounds such as hydroxy salts which are not reflective:

$Al \rightarrow Al^{+3} + 3e^-$ (oxidation), $Al^{+3} 3OH^- \rightarrow Al^{+3}(OH)_3$ (compound formation).

The oxidation of the aluminum metal is balanced by a reduction reaction such as the following.

$O_2 + 2H_2O + 2e^- \rightarrow 4OH^-$ (in neutral or alkaline solutions), $2H^+ 2e^- \rightarrow H_2$ (in acidic solutions).

The corrosion reaction typically involves an electrolyte film on the surface of the aluminum to form an ionic path between the oxidation and reduction sites on the aluminum surface. In the example of atmospheric oxygen, a film or layer of water on the surface is one suitable electrolyte. The rate of corrosion will be influenced by the availability of the oxidizing species (e.g. oxygen or hydronium, H+), the addition of soluble salts to influence the conductivity of the electrolyte, the addition of chlorides to alter the stability of the normally protective aluminum oxide film, pH buffers to influence the stability of the normally protective aluminum oxide layer or to influence the reduction reaction, or the addition of complexing agents to dissolve protective aluminum oxides or to keep aluminum corrosion products in solution. Such salts and other complexing agents may be deliberately added in a layer of material placed next to the aluminum layer. Addition of a hygroscopic material and salts to this layer can also aid in collecting atmospheric moisture for subsequent release as liquid water solution at the corrosion reaction site. The hygroscopic material or salts effectively lower the dew point of the aluminum surface, the relative humidity at which a liquid film forms on the metal surface.

Cupric and ferric chloride are specific examples of oxidizers that may be incorporated into an electrolyte layer next to the aluminum layer to accelerate corrosion of the aluminum. These materials offer several advantages. If the metal cation reduced to the metallic state in the oxidation reaction, the metal (e.g. copper or iron) deposited on the aluminum surface forms local cathodes that can accelerate corrosion of aluminum in adjacent areas. If the metal cation is not completely reduced to the metallic state, the cuprous or ferrous species may react with oxygen to restore the oxidizing power of the solution.

Figure 4:
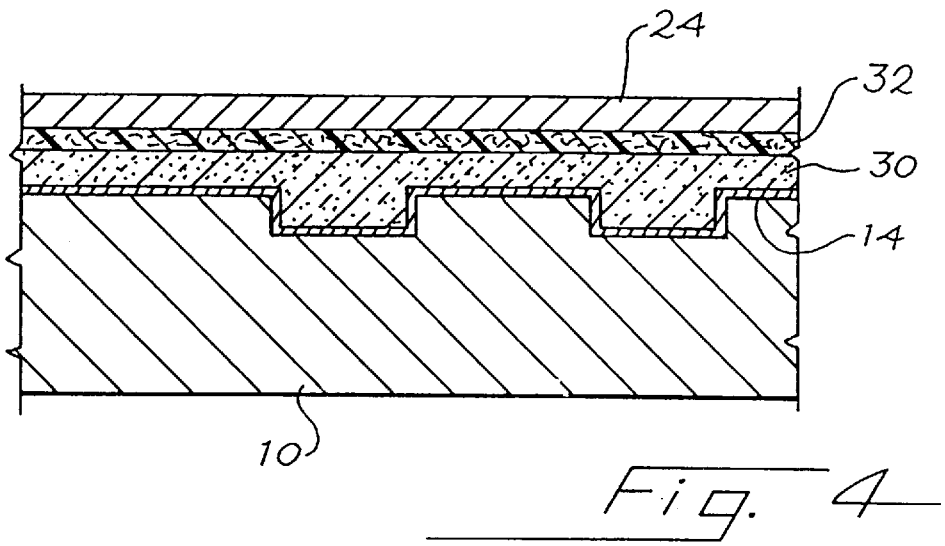

FIG. 4 shows one preferred embodiment of this invention which includes a substrate 10 and a reflective layer 14 as described above. In this case, an electrolyte layer 30 is applied adjacent to the reflective layer 14. The electrolyte layer 30 contains substances which aid the corrosion reactions, such as hygroscopic salts, pH buffers, complexing agents for aluminum, and the like. The electrolyte layer 30 is in turn covered with an outer layer 32 of a material which is permeable to environmental moisture and oxygen. The permeable layer 32 is in turn initially covered by a barrier layer 24 as described above. The barrier layer 24 prevents oxygen and water from reaching the permeable layer 32 during storage and transport. When a user wishes to read information from the optical disc of FIG. 4, the user removes the barrier layer 24. Oxygen and water vapor from the atmosphere then diffuse through the permeable layer 32 at a controlled rate. The water vapor can be, for example, collected by hygroscopic materials in the electrolyte layer 30, and subsequently made available to aid in the aluminum corrosion reactions discussed above.

Based on typical corrosion rates for aluminum, and an assumed reflective layer thickness of 55 nanometers, the reflective layer may be degraded adequately to prevent machine-reading of the optical disc in, for example, 1 to 100 hours after removal of the barrier layer 24, depending upon the availability of moisture, and the parameters of the electrolyte layer 30 and the permeable layer 32.

Table 1 illustrates the relationship between the corrosion rate $i_{corr}$, the rate of aluminum film removal L, and the time $t_{(55\ nm)}$ to corrode 55 nanometers of aluminum. In Table 1, L is estimated using Farady's law.

TABLE 1

| $i_{corr}$ (uA/cm2) | L (nm/hr) | $t_{(55\ nm)}$ (Hours) |
|---|---|---|
| 0.1 | 0.1 | 442.3 |
| 1 | 1.2 | 44.2 |
| 10 | 12.4 | 4.4 |
| 1.00 | 124.4 | 0.4 |

If desired, metallic films or pieces of a more noble metal (for example a metal such as copper or silver, or carbon) can be placed in electrical contact with an aluminum reflecting layer 14 and with an electrolyte layer 30 containing oxygen as described above or other suitable oxidizing species. In this case the galvanic couple due to the presence of the more noble element will result in more rapid and directed corrosion of the aluminum reflecting layer 14 than would otherwise occur in the absence of that second, more noble element.

Additionally, if desired the reflective layer 14 can be sputter-coated in such a manner that the reflective layer 14 itself includes more noble elements such as copper in the reflective film itself. The aluminum alloy film will have a higher corrosion rate than a purer aluminum film due to the formation of localized cathodes at the sites of the more noble elements.

Figure 14:
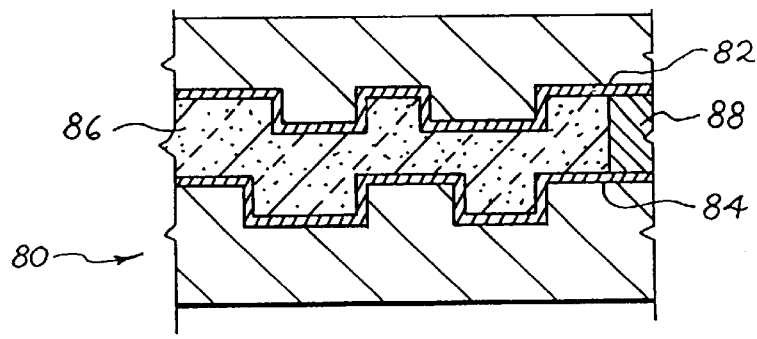
FIGS. 14 and 15 are partial cross-sectional views of optical discs that incorporate embodiments of the invention employing galvanic cells.

FIG. 14 is a schematic view of an optical disc 80 which includes an aluminum layer 82 and a copper layer 84, separated by an electrolyte layer 86. The metal layers 82, 84 may be configured for example as a conventional two-sided DVD to encode information, and the copper layer 84 provides sufficient reflectivity for conventional reading. The metal layers 82, 84 are connected electrically in any convenient manner, for example by a metal foil 88 or a conductive adhesive (e.g. an epoxy filled with carbon, silver or copper particles). The three layers 82, 84, 86 and the foil 88 form a galvanic cell, in which the aluminum layer 82 is the anode that corrodes relative to the more noble metal. The electrolyte layer 86 provides ionic continuity between the layers 82, 84, while the foil 88 provides electronic contact.

Figure 15:
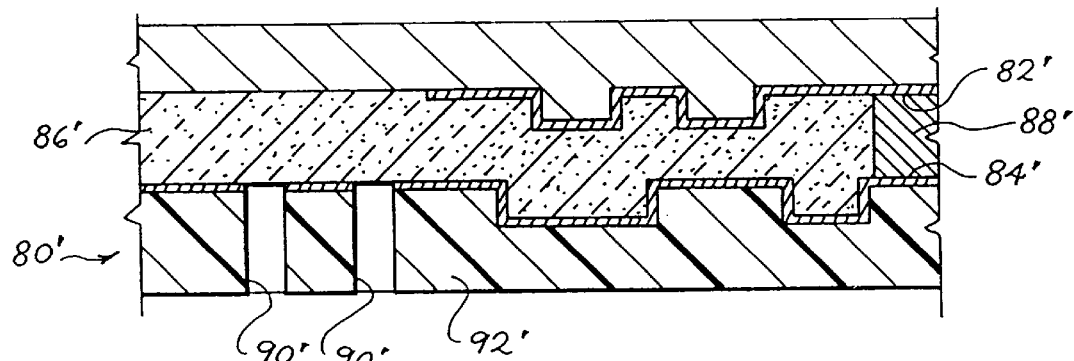

FIG. 15 shows an optical disc 80' that is similar to the disc 80 of FIG. 14. Primed reference numerals are used in FIG. 15 for elements corresponding to elements 82–88 of FIG. 14. In FIG. 15 the area of the copper layer 84' is greater than the area of the aluminum layer 82' to increase the aluminum corrosion rate. Also, openings 90' are provided through the copper layer 84' and the adjacent polycarbonate layer 92' to further increase the aluminum corrosion rate. Preferably, the openings 90' are located in an area of the disc 80' not containing stored information, such as the central portion of the disc 80'.

Figure 5:
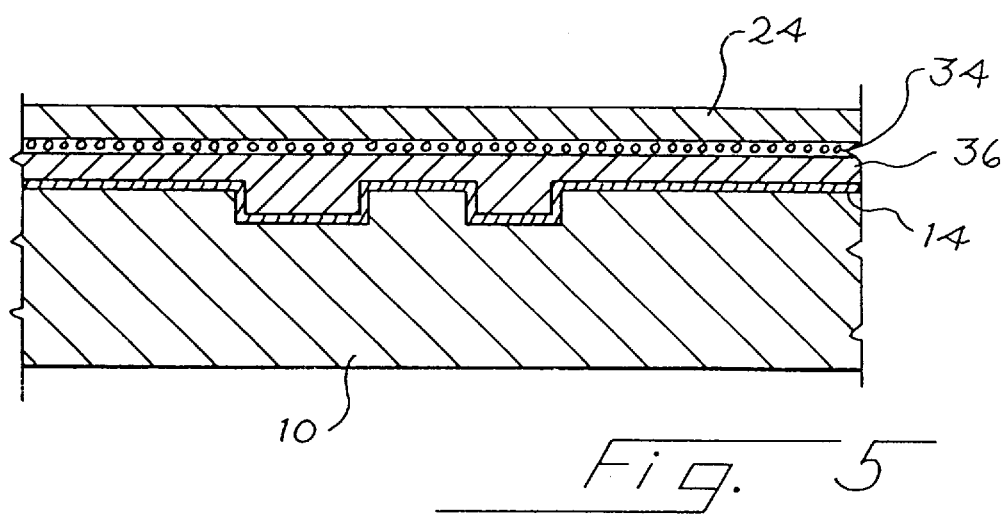

As shown in FIG. 5, it is not essential in all embodiments that atmospheric oxygen and water be used as the oxidizing species. For example, as shown in FIG. 5, microcapsules 34 can be provided between the barrier layer 24 and the permeable layer 36. These microcapsules can contain any suitable oxidizing species and electrolyte. In this example removal of the barrier layer 24 ruptures at least some of the microcapsules 34, thereby releasing electrolyte and oxidant into the permeable layer 36 The electrolyte and oxidant migrate through the permeable layer 36 and come into contact with the reflective layer 14 in order to initiate a controlled corrosion process. This embodiment is less sensitive to the availability of atmospheric moisture than the embodiment of FIG. 4.

From the foregoing it should be apparent that the reading-inhibit agent can take many forms, including electrolytes, oxidizing species, various elements more noble than the reflective metal, and permeable films that control the rate at which atmospheric oxygen and water reach the reflective layer. In various embodiments the inhibit agent can take the form of films, or it can be contained in various ways, including by use of microcapsules.

The following paragraphs detail test results related to the use of hygroscopic salts, placed on an aluminum surface, to pick up water from the atmosphere and form an electrolyte film. The hygroscopic salts may be sufficiently corrosive by themselves, or alternately they may be used in conjunction with other salts and complexing agents to provide the desired aluminum removal rate. The salts are preferably applied in the anhydrous form to the surface, and are then protected by a barrier to exclude moisture from the salts. Activation of the corrosion process occurs when the barrier is removed.

The corrosion approach is based on the principle that a dry salt will come to equilibrium with its environment. In the process of coming to equilibrium, the salt can either dissolve, to form an electrolyte solution, or become drier. Table 1a lists the humidity above saturated solutions of several salts in a closed environment. If the salt is placed in air with higher humidity than the table value, it will pick up water. If the humidity is lower than the table value, the solution will lose water. The salts used in this application include magnesium chloride and quaternary ammonium amine chlorides.

TABLE 1a

Humidity Above Saturated Solutions of Various Salts

| Solid Phase | t ° C. | % Humidity |
|---|---|---|
| $H_3PO_4.1/2H_2O$ | 24 | 9 |
| $LiCl.H_2O$ | 20 | 15 |
| $KC_2H_3O_2$ | 20 | 20 |
| $Pb(NO_3)_2$ | 20 | 98 |

Lithium chloride and potassium acetate were tested as the candidate salts. To these, either potassium hydroide (KOH) or trisodium phosphate (TSP) were added to increase the aggressiveness of the electrolyte. Placement of dilute solutions of either KOH or TSP on the disc surface quickly dissolved the aluminum film. With these aggressive salts, complexing agents, such as citrate, were not needed to remove any passive films on the aluminum.

Further, tests were conducted by placing the salts onto the unprotected aluminum layer of CDs. Some of the CDs were then left exposed to room air while others were placed in desiccators with relative humidities of 20% and 8.5%. The relative humidities in the desiccators were controlled by solutions of sulfuric acid; the specific gravity of the sulfuric acid solution was selected to provide the desired relative humidity. During these experiments, ambient relative humidities ranged from 20 to 30 percent. Four salts were used: potassium acetate (KAc), lithium chloride (LiCl), KOH, and TSP and were mixed as shown in Table 1b. The concentration of salt in the solution on the disc surface depended on the amount of water that was absorbed.

TABLE 1b

| | Salts Mixtures | |
|---|---|---|
| SALT | TSP | KOH |
| KAc (4 grams) | 1.31 g or .13 g | 0.58 g or 0.06 g |
| LiCl (4 grams) | 1.31 g or 0.13 g | 0.58 g or 0.06 g |

When LiCl was placed on the disc's aluminum surface under ambient conditions, droplets of water formed on the salt mass within 30 minutes; with KAc it took 3 hours. The water droplets formed with LiCl were clearly visible to the unaided eye; the droplets formed with KAc could be observed with the use of a magnifying glass. After these samples were allowed to stand overnight, the aluminum with LiCl showed partial corrosion, while the aluminum with KAc was intact.

The tests also showed that KOH alone was highly hygroscopic and corroded the discs under all conditions. Within the limitations of existing equipment, under the driest conditions KOH corroded the aluminum surface in all tests. The water retained in the KOH was sufficient to corrode the aluminum surface, even when a glove bag was used to apply the KOH, and a dry desiccator was used to store the sample.

At 20% RH, the LiCl (alone and in mixtures) continued to form water droplets on the disc surface and to attack the aluminum. In the 8.5% RH desiccator, visible water droplets did not form, in agreement with the table values.

TSP did not attack the aluminum when placed on the surface by itself, even under ambient conditions. TSP was not sufficiently hygroscopic to form an aggressive electrolyte film. However, when used in conjunction with LiCl at 20% RH, enough water was picked up to form an aggressive solution, which attacked the aluminum. A mixture of LiCl and TSP did not attack the aluminum in the 8.5% RH desiccator (no breakthrough after four days).

These tests demonstrated that the corrosion process can be activated by ambient moisture down to at least 20% relative humidity, and probably down to 15% based on published values for LiCl. Other salts or drier KOH may allow one to go to even lower humidities.

Reading-inhibit Agents that Operate by Absorbing Optical Radiation of the Reading Beam The digital video disk (DVD) format uses a 650 nm laser to read information from the disk. If this reading beam is absorbed to a significant degree, the return signal from the disk is attenuated. By including a light-absorbing material in the disk, it is possible to attenuate the reading signal enough to prevent the disk from being read. Preferably, the light-absorbing material is strongly absorbing at the wavelength of the reading beam. Many compounds absorb at 650 nm, and they usually appear blue or green in color.

In order to allow the disc to be read on its first use, the light-absorbing material is initially nonabsorbent at the wavelength of the reading beam. Over time, for example four to 24 hours, this light-absorbing material becomes absorbing at the wavelength of the reading beam in response to some environmental stimulus. One approach is to use a compound for the light-absorbing material that is initially colorless, but which oxidizes to a new compound which is colored upon exposure to oxygen in the atmosphere, or some other oxidant. Many compounds are known which exhibit this behavior. Four compounds which may be particularly appropriate are given in Table 2 (in their oxidized form).

TABLE 2

| Compound | Color Index Number |
|---|---|
| Indigo Carmine | 73015 |
| Methylene Blue | 52015 |
| Thionin | 52000 |
| Gallocyanine | 51030 |

The colorless precursor to the light-absorbing material is incorporated in the optical disc somewhere along the path taken by the laser light of the reading beam. For instance, the colorless precursor can be compounded within the material (typically polycarbonate) that makes up the substrate 10, or the colorless precursor can be included in a coating on a surface of the substrate 10.

Preferably, the rate at which atmospheric oxygen reaches the colorless precursor is controlled in order to render the optical disc unreadable at a selected time after the barrier layer is removed. The rate at which oxygen reaches the colorless precursor should be selected such that the optical disc can be read at least once before sufficient color is generated to make the optical disc unreadable. The rate at which oxygen reaches the colorless precursor should be high enough to ensure that the optical disc becomes unreadable within the desired time period (for example four to 24 hours). Various methods can be used to control the rate at which oxygen reaches the colorless precursor. If the light-absorbing compound is contained within the body of the substrate 107 the amount of the absorbing compound can be adjusted as appropriate for the application; higher loadings will result in quicker obscuration. The rate at which the absorbing compound becomes absorbing to the reading beam can be lowered by lowering the concentration of the absorbing compound in the substrate, or by applying an outer coating to the substrate which acts as a semipermeable oxygen barrier.

Figure 6:
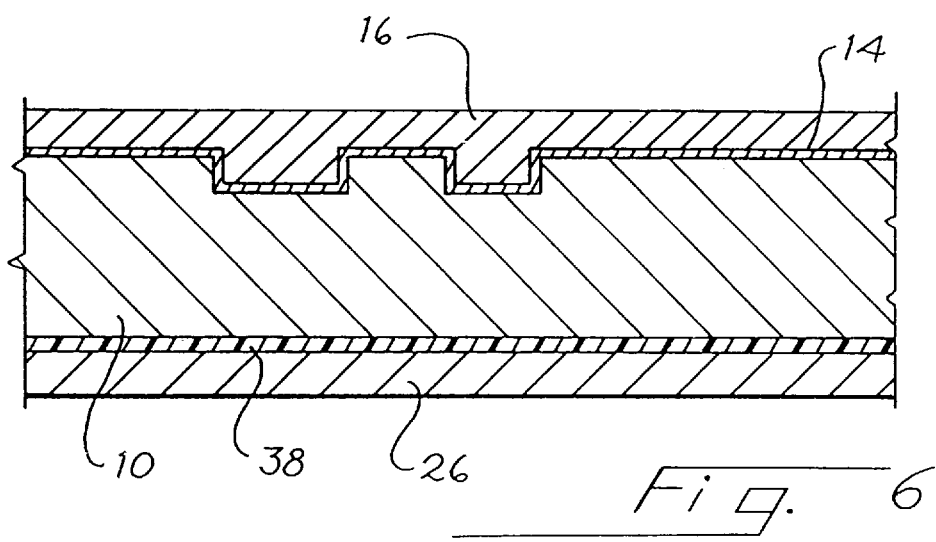

Alternately, the absorbing compound can be placed as shown in FIG. 6 in a layer 38 on a surface of the substrate 10. The rate of the oxidation reaction can be controlled in this case by choosing a matrix such as a suitable polymer for the absorbing compound layer having the appropriate barrier properties. Alternately, an additional coating layer can be employed over the absorbing layer, and this additional coating can act as a semipermeable oxygen barrier which allows oxygen to reach the absorbing layer at the desired rate.

As shown in FIG. 6, a barrier layer 26 is used to protect the absorbing layer 38 from atmospheric oxygen during storage and transport. The barrier layer can also take the form of an air-tight package, as shown in FIG. 3.

Reading-inhibit Agents that Operate by Altering Physical Dimensions of the Optical Disc Certain embodiments of the invention use a reading-inhibit agent which alters its physical dimension when activated. A superabsorbing polymer is one such material, for example a polymer or copolymer containing a carboxylic or alcohol moiety. For example, a water-absorbent resin may be formed from a cross-linked polymer or a copolymer of acrylic acid, methacrylic acid, methylacrylate-vinylacetate, starch-ethyl acrylate, starch-acrylonitrile, carboxymethyl cellulose, ethylene oxide, vinyl alcohol, acrylamide, and the like.

Such materials can be used in several ways to make an optical disc unreadable, for example as the material absorbs ambient moisture. The absorption of such moisture creates a volume change in the material, which can be used to cause a combination of any of the following effects to prevent reading: delamination, a change in the refractive index, or a change in spinning characteristics.

For example, as shown in FIG. 7, a superabsorber layer 42 can be placed between two digital video disc substrates 40. The entire digital video disc is then protected with an encapsulating barrier layer 28 similar to that shown above in FIG. 3. When the barrier layer 28 is removed, ambient moisture is allowed gradually to reach the superabsorber layer 42. As the superabsorber layer absorbs moisture, it will increase in volume, thereby causing the digital video disc to delaminate and preventing further reading of the disc.

In the example of FIG. 8, a superabsorber layer 44 is placed on the readable surface of a digital video disk 40, and this superabsorber layer is protected by a barrier layer 26. When the barrier layer 26 is removed, the superabsorber layer 44 will absorb ambient moisture and increase in volume. This volume increase causes a significant change in the refractive index of the material, which renders the digital video disc unreadable.

As shown in FIG. 9, a superabsorber layer 48 may be placed either partially or completely around a spindle hole 46 of the digital video disk 40. This superabsorber layer 48 is protected by a barrier layer (not shown in FIG. 9) prior to use. When the barrier layer is removed, ambient moisture will gradually cause the superabsorber layer 48 to expand. If the superabsorber layer 48 is placed as shown in FIG. 9, this can cause the spindle hole 46 to assume an eccentric position, thereby rendering the optical disc unreadable. Alternately, if the superabsorber layer 48 extends substantially around the spindle hole 46, the superabsorber layer 48 may expand to the point where the spindle hole 46 is too small to fit on the spindle of the reading device.

FIG. 10 shows another embodiment in which the superabsorber layer 50 is mounted near the outer rim of the digital video disk 40. As before, the superabsorber layer 50 is initially protected by a barrier layer (not shown in FIG. 10). Once the barrier layer is removed, the superabsorber layer 50 absorbs atmospheric moisture, thereby rendering the disc sufficiently out of balance to prevent reliable reading.

In all of the examples discussed above, the rate at which the super-absorber layer absorbs moisture can be modified by placing a semipermeable barrier over the exposed surface of the superabsorber layer. This barrier can regulate the diffusion of ambient moisture to the superabsorber layer, which in this way controls the time period during which the optical disc is readable after the barrier layer has been removed.

Reading-inhibit Agents that Operate by Scattering the Reading Beam

Figure 11:
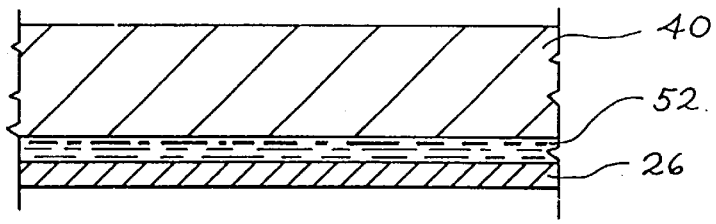
FIGS. 11 and 12 are partial cross-sectional views of optical discs that incorporate eighth and ninth preferred embodiments of this invention, respectively.

As discussed above, a laser beam is typically used as a reading beam for optical discs. If the reading beam is scattered or otherwise attenuated to a significant degree, the disc cannot be accurately read. For example, as shown in FIG. 11, a digital video disc 40 can be provided with a layer 52 that includes a material such as a solvent that will alter the optical characteristics of the adjacent portion of the digital video disc 40. For example, a polycarbonate exposed to solvent is known to craze, i.e. to form a diffuse, opaque film or layer, which scatters the reading beam. Suitable solvents include organic liquids or vapors such as acetone, xylene and the like. Depending upon the concentration of the solvent and the exposure time, various rates of loss of transparency can be obtained. Other coatings in addition to polycarbonates can exhibit the same effective behavior by slight dissolution in an organic solvent followed by deposition on the surface of the disc as the solvent evaporates or is lost. The redeposition process may also include a recrystalization of a glassy coating layer. This redeposition results in a less transparent and therefore less readable surface on the disc. The layer 52 of FIG. 10 can include microencapsulated solvent beads which will rupture on removal of the adjacent barrier layer 26.

Embodiments that Include Reading-inhibit Agents Without Barrier Layers

As pointed out above, it is not essential in all embodiments that a barrier layer be included. Rather, in some embodiments it is the act of reading the disc that activates the reading-inhibit agent. For example, optical radiation associated with disc reading, or rotation associated with disc reading can activate the reading-inhibit agent.

Figure 12:
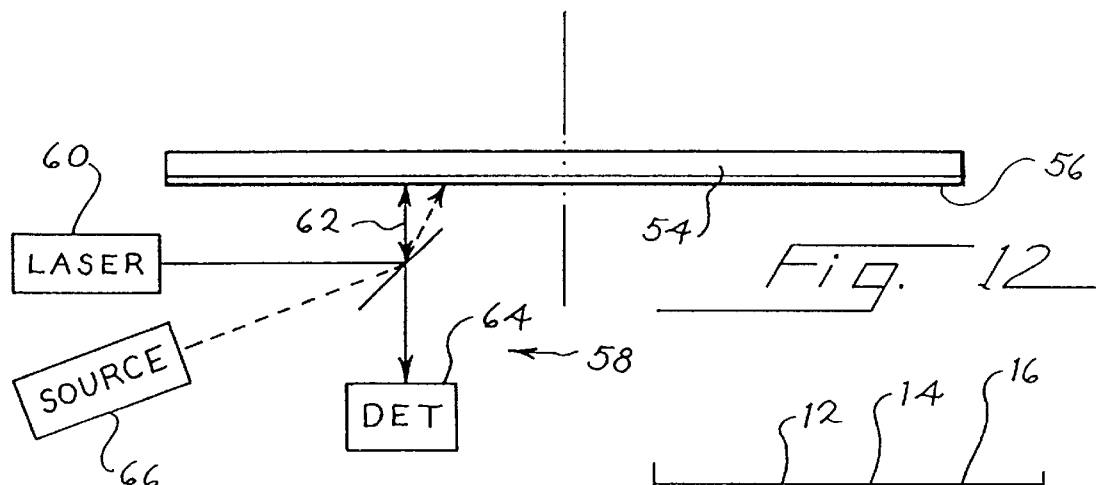

As shown in FIG. 12, one such embodiment includes an optical disc 54 which includes a reading-inhibit agent 56 adjacent one surface. In this case the reading-inhibit agent 56 is a photoactive material that, when activated by suitable optical radiation, is suitably changed in optical or physical characteristics so as to inhibit further reading of the disc. The photoactive material can alternately be dispersed in the bulk of the disk and can for example change from clear to opaque at the wavelength of the reading beam upon exposure to suitable optical radiation. As shown in FIG. 12, the disc 54 is installed in a reading device 58. The reading device 58 includes a first optical source such as a laser 60 that directs the reading beam 62 against the disc 54. Returning radiation from the disc 54 is sensed by a detector 64, in the conventional manner. In this embodiment, the reading device 58 further includes a second optical source 66. The second optical source 66 destroys or degrades the optical transmission or reflection required to read the disc. The second source 66 may be a conventional source such as a high pressure arc, an incandescent bulb, a fluorescent lamp, or a laser. As the disc 54 is read, radiation from the second source 62 interacts with the reading-inhibit agent 56 to inhibit further reading of that portion of the disc 54. The second source 62 is arranged such that the second source 62 does not illuminate any portion of the disc 54 until after that portion of the disc 54 has been read by the reading beam 62.

In alternate embodiments the reading beam 62 itself may initiate optical changes in the read inhibiting agent 56, thereby dispensing with the need for the second source 62.

Alternately, when the second source 62 is used, the need for a separate read inhibit agent 56 may be eliminated. In this case, the second source 66 may for example be a passively q-switched microchip laser focused on the surface of the disc. The effect of this laser is to create scattering centers by ablating the read surface of the disc. The scattering centers reduce the optical transmission of the disc to the reading beam 62.

In either case, the second source 66 should be interlocked in a way that prevents consumer tampering, and should track in a way so as not to interfere with the initial reading of the disc. When the second source 62 is of sufficient power to provide the ablating action described above, access to the information on the disc will be denied almost immediately after it is read.

Figure 13:
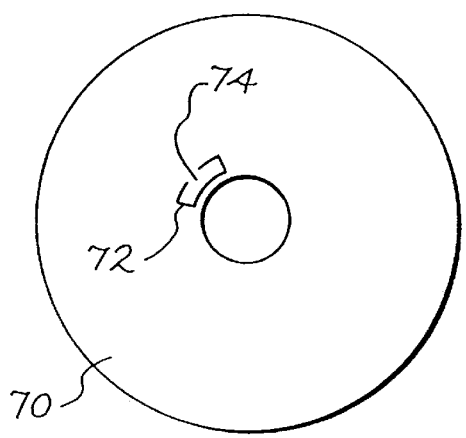
FIG. 13 is a plan view of an optical disc that incorporates a tenth preferred embodiment of this invention.

FIG. 13 shows another embodiment having a reading-inhibit agent which is activated by the act of reading the disk. In this case an optical disc 70 includes a reservoir 72 that contains a reading-inhibit agent, such as a suitable solvent. The reservoir 72 includes an opening 74. When the disc is first rotated in order to be read, solvent passes out of the reservoir 72 via the opening 74, and in this way a small quantity of solvent is released to the disc. The solvent can degrade the optical characteristics of the disc, as discussed above, to prevent reading of the disc a predetermined time after the solvent has left the reservoir. As one example, the reservoir 72 may be formed in a region bounded by two concentric annular ridges, similar to the stacking rings conventionally used in current optical discs.

Additional Embodiment

Figure 17:
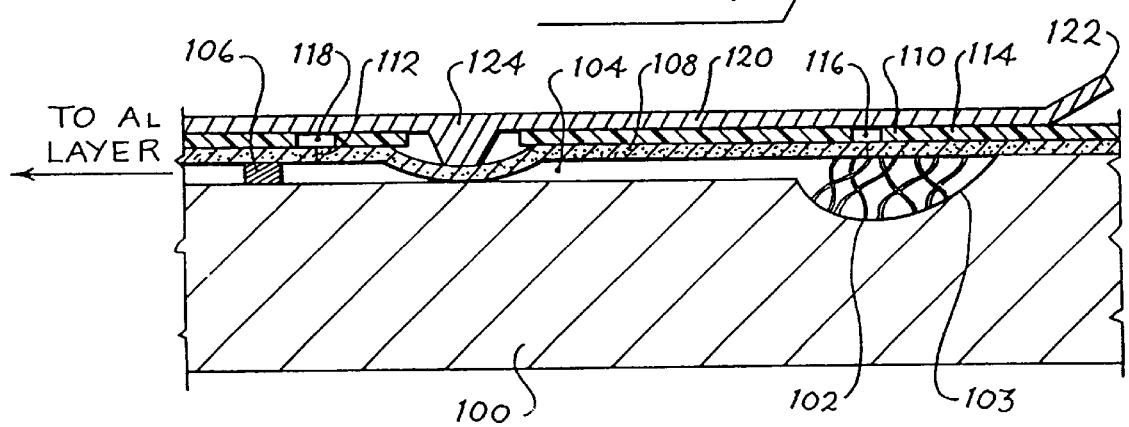
FIG. 17 is a partial cross-sectional view of a disc containing a reservoir.

FIG. 17 shows a cross-sectional view that illustrates one form of a disc 100 containing a reservoir 102 as discussed immediately above. One or more capillary-tube-sized passages 104 are radially oriented to allow a suitable reading-inhibit agent (such as a solvent or a corrosive agent as discussed above) to flow from the reservoir 102 radially outwardly to the region of the disc that stores information via information-encoding features. The reservoir 102 and the passage 104 are closed by a silicone membrane 108 that defines an array of vents 110, 112. In this example, the vents 110, 112 are formed as pin pricks. The silicone membrane 108 is covered by a polycarbonate sheet 114 that defines vents on 116, 118 aligned with the vents 110, 112, respectively.

A releasable, peel-off label 120 is removably secured by a suitable adhesive to the polycarbonate layer 114. This peel-off label 122 includes a tab 122 to facilitate removal and a protrusion 124. The protrusion 124 passes through an opening in the polycarbonate layer 114 and presses the silicone membrane 108 into the passage 104 to create a mechanical valve that stops the flow of reading-inhibit agent radially outwardly from the reservoir 102. Optionally, the passage 104 may also include a valve element 106 of a material that is dissolved by the reading-inhibit agent. For example, a valve element 106 of aluminum can be used in cases where the reading-inhibit agent is corrosive to aluminum. Preferably, the reservoir 102 includes a wick 103 made of cotton or microfiber to retain fluid in the reservoir 102. The passage 104 may have a cross-sectional size of 0.02 inch.

Preferably, the peel-off label 120 is sized such that the label must be removed in order to allow the disc 100 to be read. Once the label 120 has been removed, the vents 110, 112 are opened, and the protrusion 124 is removed. This allows the silicone membrane 108 to relax upwardly, thereby opening the passage 104. When the disc 100 is rotated during a reading operation centrifugal force causes the reading-inhibit agent in the reservoir 102 to flow radially outwardly via the passage 104 onto the information-encoding portion of the disc 100.

In some embodiments the reading-inhibit agent may be selected so as not to interfere with normal reading of the disc 100 until a selected time after the reading-inhibit agent has contacted the information carrying portion of the disc. As an alternative, when the optional valve element 106 is used, the valve element 106 prevents the reading-inhibit agent from reaching the information carrying portion of the disc 100 until the valve element 106 is dissolved by the reading-inhibit agent. In this way, the plug 106 provides a timed release of the reading-inhibit agent onto the information carrying portion of the disc.

Tests have shown that two-pass transmission of the disc typically must fall to about 45 percent of the original value before a significant number of reading errors occur, and to approximately 30 percent of the original value before the disc becomes unplayable.

Conclusion

The optical discs described above have a short effective life, limited either by the number of times the disc is played (e.g. one, two or more times), or by the passage of time after the disc is dispensed (e.g. a selected number of hours after the disc is sold or rented, after the consumer opens a package, or after the disc is inserted into a disc player). The effective life of the disc may be limited in response to reading of the disc, opening of the disc, or rotation of the disc. Various methods for limiting the effective life of the disc have been described, including physical, chemical, and electrochemical methods. Physical methods include the diffusion of air or a component of air such as oxygen, resulting in physical and/or chemical effects; the use of optical activation to cause a physical change in the disc; or the use of physical forces or the removal of forces associated with rotation of the disc or removal of a label to cause a physical change in the disc. Chemical methods include a layer of the disc interacting with a chemical applied when the package is opened or by the vendor at the time of sale. Electrical or electrochemical methods include the use of an electrochemically active system to accelerate corrosion.

It should be apparent from the foregoing detailed description that the present invention can be implemented in a wide variety of forms. Barrier layers can take the form of sheets or patches on a surface of the disc, or of encapsulating packaging. In some cases barrier layers are not required. Reading-inhibit agents can take many forms, including materials which change optical or physical characteristics of the reflecting layer, or various other components of the optical disc. Reading-inhibit agents can be employed as microencapsulated materials, materials formed in layers over selected regions of a disc, or materials incorporated into other components of a disc. Reading-inhibit agents may extend over the entire information-encoding surface of the optical disc, or alternately may be limited to selected portions, for example portions that encode indexing or other introductory information.

It should therefore clearly be understood that the foregoing detailed description is intended by way of illustration, not limitation. It is only the following claims, including all equivalents, that are intended to define the scope of this invention.

We claim:

1. An optical disc comprising:
   a substrate;
   at least one layer supported by the substrate and having machine-readable, information-encoding features;
   a reading-inhibit agent, included in the disc and activated by machine-readable the disc, said information-encoding features being machine-readable prior to activation of the reading-inhibit agent, said reading-inhibit agent operative, once activated, to alter the disc to inhibit further reading of the disc.

2. The invention of claim 1 wherein the inhibit agent is activated by optical radiation incident on the disc during machine-reading of the disc.

3. The invention of claim 1 wherein the inhibit agent is activated by rotation of the disc during machine-reading.

4. The invention of claim 1 further comprising a reservoir on the disc containing the reading-inhibit agent, said reservoir configured to release the reading-inhibit agent when the disc is rotated during machine-reading.

5. An optical disc comprising:
   a substrate;
   at least one layer supported by the substrate and having machine-readable, information-encoding features;
   a reservoir included in the disc;
   a passageway interconnecting the reservoir and a portion of the disc comprising the information-encoding features; and a reading-inhibit agent, included in the reservoir and automatically activated by machine-reading the disc, said information-encoding features being machine-readable prior to activation of the reading-inhibit agent, said reading-inhibit agent operative, once activated, to alter the disc to inhibit further reading of the disc.

6. The invention of claim 5 wherein the passageway comprises a valve.

7. The invention of claim 6 wherein the valve comprises a valve element that is soluble in the reading-inhibit agent.

8. The invention of claim 6 wherein the valve comprises a mechanical valve.

9. The invention of claim 7 comprising a wick disposed in the reservoir.

10. The invention of claim 7 further comprising at least one vent in communication with the passageway.

11. The invention of claim 1 or 5 wherein the reading-inhibit agent, once activated, provides a short effective life for the disc.

12. The invention of claim 1 or 5 wherein the reading-inhibit agent, once activated, provides a short practical usage lifetime for the disc.

13. A method for inhibiting reading of an optical disc, comprising the following steps:
   (a) providing an optical disc comprising a substrate, at least one layer supported by the substrate and having machine-readable, information-encoding features, and reading-inhibit agent, said information-encoding features being machine-readable prior to activation of the reading-inhibit agent, said inhibit agent activated by optical radiation and operative, one activated, to alter the disc to inhibit further reading;
   (b) providing a reading device operative to read the disc, said reading device comprising a source of optical radiation; and
   (c) reading the disc with the reading device and concurrently activating the inhibit agent with optical radiation from the source.

14. The method of claim 13 wherein the reading device provided in step (b) additionally comprises a source of a reading beam, in addition to the source of optical radiation.

15. A method for inhibiting reading of an optical disc, comprising the following steps:
   (a) providing an optical disc comprising a substrate, at least one layer supported by the substrate and having machine-readable, information-encoding features, and a reading-inhibit agent, said information-encoding features being machine-readable prior to activation of the reading-inhibit agent, said inhibit agent activated by optical radiation and operative, one activated, to alter the disc to inhibit further reading;
   (b) providing a reading device operative to read the disc, said reading device comprising first and second sources of optical radiation; and
   (c) reading the disc with the first source and concurrently activation the inhibit agent with the second source.

16. The method of claim 13 or 15 wherein the reading-inhibit agent, once activated, provides a short effective life for the disc.

17. The invention of claim 13 or 15 wherein the reading-inhibit agent, once activated, provides a short practical usage lifetime for the disc.

* * * * *

UNITED STATES PATENT AND TRADEMARK OFFICE
CERTIFICATE OF CORRECTION

PATENT NO. : 6,011,772

DATED : January 4, 2000

INVENTOR(S) : Rollhaus et al.

It is certified that error appears in the above-identified patent and that said Letters Patent is hereby corrected as shown below:

Claim 1, line 46, delete "machine-readable" and insert --machine-reading--.

Signed and Sealed this

First Day of May, 2001

Attest:

NICHOLAS P. GODICI

Attesting Officer    Acting Director of the United States Patent and Trademark Office